B. D. COPPAGE.
PIPE CONNECTION.
APPLICATION FILED JULY 6, 1907.
913,265. Patented Feb. 23, 1909.
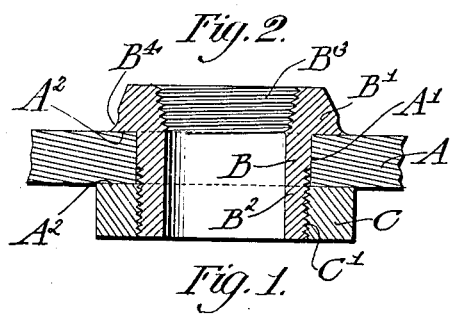
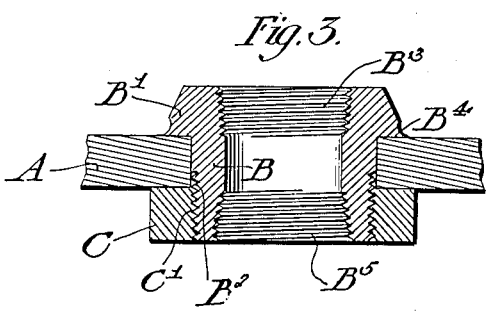
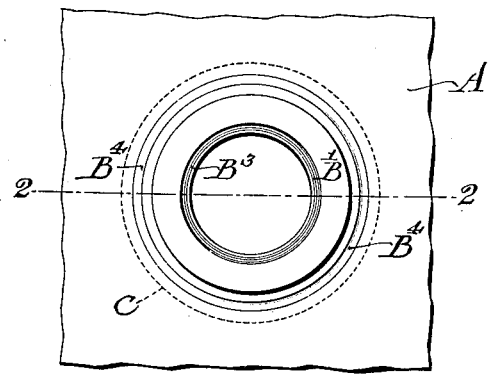
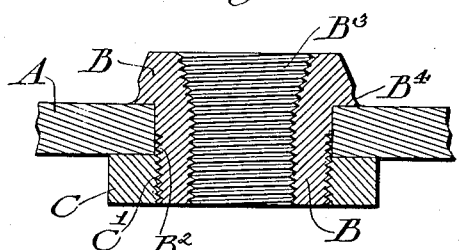
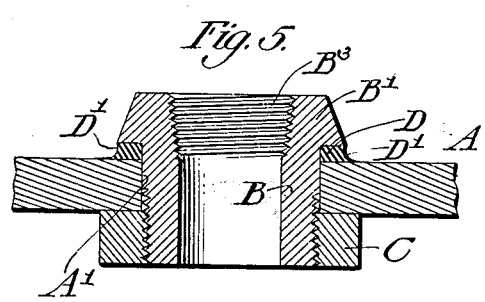
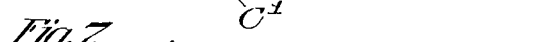
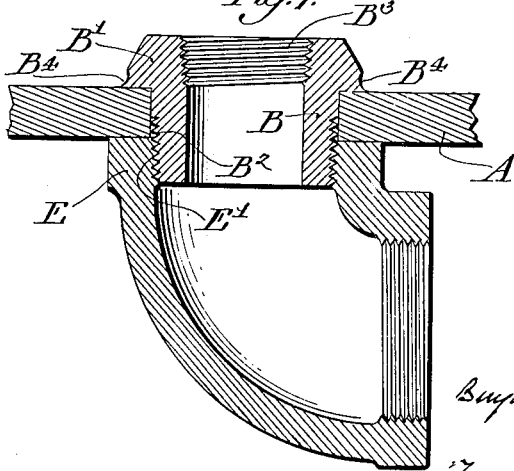
WITNESSES:
INVENTOR
Benjamin D. Coppage
BY
Francis L. Chambers
his ATTORNEY.

UNITED STATES PATENT OFFICE.

BENJAMIN D. COPPAGE, OF WILMINGTON, DELAWARE, ASSIGNOR TO EDGE MOOR IRON COMPANY, OF EDGEMOOR, DELAWARE, A CORPORATION OF DELAWARE.

PIPE CONNECTION.

No. 913,265.  Specification of Letters Patent.  Patented Feb. 23, 1909.

Application filed July 6, 1907. Serial No. 382,452.

*To all whom it may concern:*

Be it known that I, BENJAMIN D. COPPAGE, a citizen of the United States of America, residing in Wilmington, in the county of Newcastle and State of Delaware, have invented a certain new and useful Improvement in Pipe Connections, of which the following is a true and exact description, reference being had to the accompanying drawings, which form a part thereof.

My present invention relates to means for connecting pipes in metallic walls, and particularly to the means for connecting pipes into the walls of metallic reservoirs, heating tanks and boilers, and the like.

The object of the invention is to provide a connection which can be readily and cheaply formed without the use of special or elaborate tools and in which standard fitting parts may be used.

In carrying out my invention, I employ an attachment or fitting, comprising a cylindrical body portion or bushing passing through a passage bored or drilled in the wall to which the connection is to be made and provided with a head bearing against one side of the wall, usually the outer side, and having a collar secured on the opposite end of the body portion to bear against the other side of the wall.

Preferably I thread the collar internally and externally thread the corresponding portion of the body portion of the fitting, but any means for securing the collar in place may be employed which will permit of a ready and positive connection of the parts. The portion of the head adjacent the wall I make of malleable material and a tight joint is made and the bushing firmly secured in place by calking or fullering this portion of the head, the calking operation being of a character which may be readily carried out by hand tools. The fitting is provided with the usual threads for the pipe or pipes to be connected to it.

The necessary malleability of the head portion adjacent the wall may be provided by making the portion of the head in the form of a washer of malleable material surrounding the body of the head, and supported by a flange or head portion integral with the body, or the entire head may be formed by a malleable nut or collar similar to the collar first described; preferably, however, the head and body of the fitting are formed of an integral malleable piece of metal.

For a better understanding of my invention, reference may be had to the accompanying drawings of which—

Figure 1 is a plan view of a portion of the wall having my attachment fitting secured to it. Fig. 2 is a sectional elevation on the line 2—2 of Fig. 1. Fig. 3 is a view similar to Fig. 2, showing a slightly modified form. Fig. 4 is a view similar to Fig. 2, showing a third form differing slightly from that of Figs. 2 and 3. Fig. 5 is a view similar to Fig. 2, showing a construction in which the malleable portion of the head is formed by a washer of malleable material. Fig. 6 is a view similar to Fig. 2 showing a construction in which the head of the fitting is formed by a collar or nut, and Fig. 7 is a view similar to Fig. 2, showing a construction in which the collar is formed by the end of the elbow fitting.

Referring first to the construction shown in Fig. 1 of the drawings, A represents the metallic wall of a boiler, heating tank, reservoir or the like, having formed in it a passage $A^1$. The attachment fitting comprises a hollow body portion B passing through the wall and fitting snugly in the passage $A^1$, an integral head portion $B^1$ bearing against the outer side of the wall, and a nut or collar C bearing against the other side of the wall and provided with threads $C^1$ which mesh with the threads $B^2$ formed on the corresponding portion of the fitting. Pipe connection threads $B^3$ are formed internally in the fitting at its head end, which is usually the outer end. In assembling, the opening $A^1$ is first bored or drilled and the collar and head engaging portions $A^2$ of the wall faced off when necessary to make these surfaces smooth and normal to the opening $A^1$. The part B is then inserted and the collar C screwed up tightly. The next and final step in securing the attachment fitting in place consists in calking the portion of the head adjacent the wall as indicated at $B^4$ to make a tight joint between the fitting and the wall, and to firmly secure the fitting in position. In practice I have found that the fullering or calking of the head portion against the wall results in sufficient friction between the parts to permanently secure the fitting in place, so that it is thereafter practically impossible to unscrew the parts and so that they will not be disturbed by the force employed in screwing or unscrewing the pipe in or out of the thread B³. The advantage of such a secure connection is, of course, obvious, and it is no real drawback that the parts after being once tightened cannot be disassembled by unscrewing the collar C, especially as the fitting can be cut away if necessary to permit the insertion of a new fitting when the original one is defective, without weakening or otherwise injuring the wall to which it is secured.

The construction of Fig. 3 differs from that of Fig. 2 merely in that the inner end of the fitting is threaded at B⁵ so that the pipes may be attached to the fitting at each side of the wall.

In Fig. 4, the threads B³ are extended through the entire body of the fitting, so that the pipe connected to the fitting may extend clear through it.

The construction of Fig. 5 differs from that of Fig. 2 in that a collar or washer D surrounds the body of the heading between the head B¹ and the adjacent face of the wall A, the washer being malleable and of material which may be different from that of the body portion of the fitting. For instance, the body portion may be of cast iron and the washer D of copper. The parts are secured in position by calking the washer D as indicated at D¹.

In Fig. 6, the head B⁶ of the fitting is not integrally connected to the body of the fitting, but is screwed on, the threads B² being extended for the purpose. In the form of my invention shown in this figure, the body of the bushing is smaller than the passage A¹ and the collar C and head B⁶ are provided with shoulders C² and B⁸ which extend into the ends of the passage A¹. In this form also, the pipe connection to the fitting is made by means of threads B⁷ formed externally on the bushing body.

The construction of Fig. 7 differs from that of Fig. 2 in that the collar C of the latter figure is replaced by the end of the elbow fitting E, which is provided with threads E¹ meshing with the threads B².

With all the forms of my invention disclosed it will be observed that the only work done on the wall A consists in boring or drilling the passage A¹ and facing off the surfaces A² when necessary. The fitting parts proper may be standard parts taken from stock, made by automatic or semi-automatic machinery and of standard dimensions, accurately and uniformly threaded. After the hole A¹ is formed, and the surfaces A² faced off, all that needs to be done to permanently secure the fittings in place is, to insert the fitting body, secure the collar in place and then calk the head portion adjacent the wall. The calking operation is such that it may easily be carried out by means of a simple calking blade and hand hammer, and in such a manner as not to injure the thread by which the pipe connection is secured to the fitting. The construction is much more secure and reliable than is obtained by threading the pipe to be connected into a threaded opening formed in the wall and as is well known, it is exceedingly difficult and usually practically impossible to form really satisfactory threads in a thin boiler wall or the like, even when the wall is reinforced with a riveted pad. Especially is this so when the openings are threaded outside of a construction shop, as is frequently necessary with such connections.

Having now described my invention, what I claim as new and desire to secure by Letters Patent, is,

1. An attachment fitting for connecting a pipe into a metallic wall, said wall having a passage through it, comprising a hollow member having a thread for a pipe connection having a body portion extending through said passage and a head secured to said body portion and bearing against one side of said wall, the portion of said head immediately adjacent the wall being of malleable material to permit it to be calked, and a collar attached to the body portion and bearing snugly against the other side of said wall prior to any calking operation, whereby when the malleable portion of said head is calked, a tight joint between the fitting and the wall is made and the parts are rigidly secured together without injuring said thread.

2. An attachment fitting for connecting a pipe into a metallic wall, said wall having a passage through it, comprising a hollow member of malleable metal having a body portion passing through the wall passage and an integral head portion bearing against one side of the wall, the other end of the member being externally threaded, and a collar or nut threaded internally screwed on said threaded part of the member and bearing against the other side of the wall, said member being threaded for the pipe connection and the portion of the head adjacent the wall being calked sufficiently to make a tight joint between the member and wall and firmly secure the member in place, thereby preventing rotation of the member when the pipe and member are connected and disconnected.

BENJAMIN D. COPPAGE.

Witnesses:
CHARLES G. GUYER,
HERBERT B. CHAMBERS.